T. A. COCHRANE,

Assignor to J. HENDY.

Ore-Stamp Feeder.

No. 9,061. Reissued Feb. 3, 1880.

Witnesses:

John S. Boone

Wm. F. Clark.

Inventor:

Thomas A. Cochrane

Per Boone & Osborn

Attorneys.

UNITED STATES PATENT OFFICE.

THOMAS A. COCHRANE, OF SAN FRANCISCO, CALIFORNIA, ASSIGNOR TO JOSHUA HENDY.

ORE-STAMP FEEDER.

SPECIFICATION forming part of Reissued Letters Patent No. 9,061, dated February 3, 1880.

Original No. 148,597, dated March 17, 1874. Application for Reissue filed November 17, 1879.

*To all whom it may concern:*

Be it known that I, THOMAS A. COCHRANE, of the city and county of San Francisco, State of California, have invented an Improved Ore-Feeder for Stamp-Mills; and I do hereby declare the following description and accompanying drawings are sufficient to enable any person skilled in the art or science to which it most nearly appertains to make and use my said invention or improvement without further invention or experiment.

My improved ore-feeder consists of an inclined rotating table, in combination with a hopper for receiving and depositing the ore upon the table and suitable guides or scrapers for directing it to the desired point.

Figure 1:
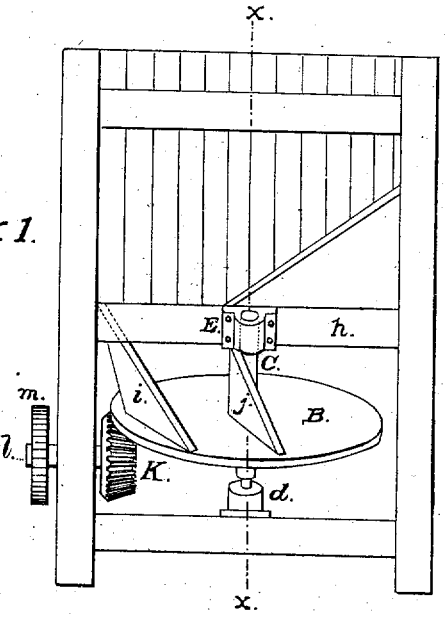
Figure 2:
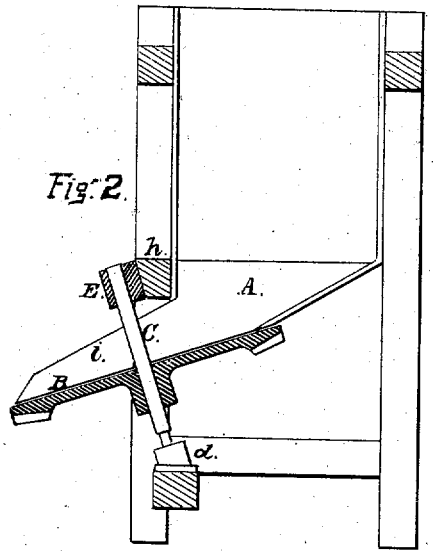
Figure 3:
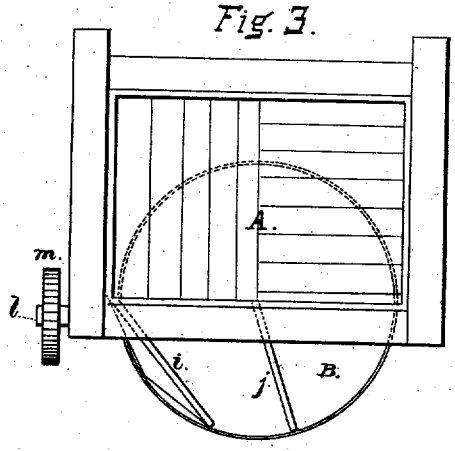

The following description fully describes my improvements and their connection with a stamp-battery:

Figure 1 of the drawings is a side elevation. Fig. 2 is a side sectional elevation taken through *x x*, Fig. 1. Fig. 3 is a plan.

A is a hopper, which is mounted in any suitable frame-work. Below this hopper is a circular table, B, which has a fixed shaft or spindle, C, passing through its center, the lower end of which steps in a block, *d*, upon one of the lower timbers of the frame A, while its upper end is supported in a box, E, which is secured to the timber *h* above. This table is represented in the present instance as standing at an angle of about twenty degrees, at which inclination it will generally be worked; but it can be set at various angles or in a horizontal plane, as required.

The shaft C, which carries the table, will always stand at a right angle to the plane of the table, and is set at one side of the frame, as shown at Fig. 2, so that one-half of the table will project outside of the frame.

The hopper A is so constructed that it will deliver the ore upon the table B at or near its highest side, and at one side of a radial line drawn from the center post or shaft, C, to the highest point in the circumference of the table. The hopper is extended down to the surface of the table on three sides, leaving the side facing the lower edge of the table open as high as the timber *h*.

A side board or guide, *i*, is secured either to the frame or lower part of the hopper, so as to extend along the outer rim of the table to the point where the ore is to be fed into the battery, and another guide or scraper, *j*, extends from the opposite side of the opening down to the lower part of the table, the two forming a way along which the ore will be forced by the rotating table until it falls over the edge between the ends of the guides *i j*. The table is toothed around the outer rim of its under side, and a bevel-pinion, K, engages with this toothed rim.

The pinion K is secured to a short horizontal shaft, *l*, which is supported in one of the timbers of the frame, as shown, and this shaft carries a ratchet-wheel, *m*, on its outer or opposite end.

In operation, the frame, with its hopper and rotating table, is set close up to the battery, so that the lower side of the table will project over the battery. The usual rod-connections for operating the ratchet *m* from the tappet on the stamp-stem will then be applied. The ore, being deposited in the hopper A, will settle down upon the table B, and be carried by its rotation along between the guides *i j* until it drops from the edge of the table into the battery, being regulated in quantity by the drop of the stamp operating through the connecting-rod and ratchet *m* to rotate the table.

For feeding some substances, a pulley can be substituted for the ratchet-wheel *m* and a belt employed for driving the machine.

The guide *j* also serves as a scraper to scrape off the ore as the table rotates below it, and for this purpose an inclined knife-edge might be used in order to avoid friction.

Having thus described my invention, what I claim, and desire to secure by Letters Patent, is—

1. The inclined rotating table B, in combination with the hopper A and guides *i j*, substantially as and for the purpose set forth.

2. The inclined rotating table B, disposed in position below a hopper, and having a toothed rim, in combination with the pinion K, shaft *l*, and ratchet *m*, substantially as and for the purpose set forth.

3. The combination, with the hopper A and its chute and guides *i j*, of the inclined rotating table B, substantially as and for the purpose set forth.

4. The hopper A, with its chute and the guides *i j*, in combination with the inclined rotating table B, with a toothed rim, and the pinion K on a shaft, *l*, having a ratchet, *m*, substantially as and for the purpose set forth.

5. In an ore-feeder for stamp-mills, the combination, with the hopper A, of the inclined rotating table B and parallel guides *i j*, located to one side of the center post or shaft, C, with their upper ends extending from the lower end of the hopper and their lower ends to the lowest edge of the table, substantially as and for the purpose set forth.

In witness whereof I have hereunto set my hand and seal.

THOMAS A. COCHRANE. [L. S.]

Witnesses:

W. I. PETTIGREW,

P. A. BROWN.